United States Patent [19]
Van Slyke

[11] Patent Number: 6,017,854
[45] Date of Patent: Jan. 25, 2000

[54] SIMPLIFIED MUD SYSTEMS

[75] Inventor: Donald C. Van Slyke, Missouri City, Tex.

[73] Assignee: Union Oil Company of California, El Segundo, Calif.

[21] Appl. No.: 08/864,701

[22] Filed: May 28, 1997

[51] Int. Cl.[7] .............................. C09K 7/06; C09K 7/00
[52] U.S. Cl. .................. 507/118; 507/103; 507/138; 507/203; 507/221; 507/265; 507/925
[58] Field of Search ...................... 507/103, 118, 507/138, 203, 221, 265, 925; 166/305.1

[56] References Cited

U.S. PATENT DOCUMENTS

| | | | |
|---|---|---|---|
| 2,697,071 | 12/1954 | Kennedy | 507/118 |
| 2,969,321 | 1/1961 | Carpenter | 507/118 |
| 3,140,747 | 7/1964 | Mitacek | 507/118 |
| 4,436,636 | 3/1984 | Carnicom | 507/118 |
| 4,740,319 | 4/1988 | Patel et al. | 507/118 |
| 4,941,983 | 7/1990 | Coates et al. | 507/138 |
| 5,189,012 | 2/1993 | Patel et al. | 507/103 |
| 5,607,901 | 3/1997 | Toups, Jr. | 507/138 |
| 5,629,270 | 5/1997 | Van Slyke | 507/118 |
| 5,707,940 | 1/1998 | Bush et al. | 507/138 |
| 5,807,811 | 9/1998 | Malchow, Jr. | 507/138 |

*Primary Examiner*—Philip Tucker
*Attorney, Agent, or Firm*—Shlomo R. Frieman; Gregory F. Wirzbicki

[57] ABSTRACT

Simplified drilling fluids (and other well bore fluids) contain a non-aqueous-base fluid and a viscosifying/fluid loss agent that meets certain performance criteria.

28 Claims, No Drawings

SIMPLIFIED MUD SYSTEMS

BACKGROUND

The present invention relates to (a) non-aqueous-base wellbore muds or fluids (e.g., drilling fluids, completion fluids, workover fluids, packer fluids, spotting fluids, coring fluids, perforating fluids, gravel packing fluids, and hydraulic fracturing fluids); (b) methods for using such wellbore fluids (e.g., drilling, completion, workover, packing, spotting, coring, perforating, gravel packing, and hydraulic fracturing operations); and (c) systems (for drilling a well in or for producing a natural resource from or for hydraulically fracturing a subterranean formation) having a drilling fluid or other wellbore fluid present therein. As used in the specification and claims, the term "non-aqueous-base" as used to modify the terms "wellbore mud", "wellbore fluid", and any specific type of wellbore mud or fluid such as drilling fluids, completion fluids, packer fluids, etc. means that a non-aqueous fluid is the continuous phase of such mud or fluid.

While non-aqueous-base wellbore drilling fluids are generally superior in comparison to water-base wellbore fluids and have undergone many changes since their introduction, there is still a need for further improvement. For example, the development of non-aqueous-base drilling fluids began as early as 1920 when engineers recognized that exposure of certain formations to filtrate from water-base fluids resulted in a loss of productive capacity. Non-aqueous-base drilling fluids have many advantages over water-base drilling fluids including, but not limited to, (1) the ability to drill a gauge hole, (2) superior shale inhibition, (3) high lubricity, (4) high temperature stability, (5) low chemical reactivity (e.g., non-reactive with chemicals in a subterranean formation), and (6) high rates of drill penetration due to synergism with polycrystalline diamond compact drilling bits.

However, since their inception, non-aqueous-base drilling fluids have developed into complex, expensive systems that generally contain (1) a petroleum derived—or synthetic fluid, (2) water, (3) a primary emulsifier, (4) a secondary emulsifier, (5) a wetting agent, (6) a viscosifying agent (e.g., an oil-wettable organophilic clay and/or a polymer), (7) lime, (8) a weighting agent, and, quite frequently, (9) a shale inhibiting salt (e.g., calcium chloride and/or sodium chloride), (10) calcium carbonate, (11) a thinner, (12) a fluid loss control agent (e.g., asphaltenes, gilsonite, oil-wettable lignite (such as amine-treated lignites), and (13) a polar activator, and, when needed, (14) a lost circulation material (e.g., granular materials (such as walnut and pecan shells), flaked materials (such as cellophane and polyethylene flakes), and fibrous materials (such as wood fibers, plant fibers, and synthetic fibers)).

Despite the numerous advantages of non-aqueous-base drilling fluids over water-base drilling fluids, the complexity and high cost of non-aqueous-base drilling fluids has tended to restrict their use in drilling operations to wells drilled in water sensitive formations, complex three dimensional wells, high temperature wells, and, very often, to just the lower portion of such wells.

In the case of non-aqueous-base packer fluids, these wellbore fluids have severe drawbacks when employed to complete deep, high pressure, high temperature wells. This is due to the fact that the requisite packer fluid density increases with increasing well depth and, therefore, packer fluids used in deep wells tend to be quite dense. Accordingly, non-aqueous-base packer fluids used in deep wells contain significant concentrations of one or more weighting agents to achieve the required density. One disadvantage of employing these non-aqueous-base packer fluids is that, due to gravity, the weighting agent eventually settles out on top of the packer, creating a hard, cement-like plug that could be roughly 100 m (328 ft) or more thick. (Furthermore, at downhole temperatures of approximately 148.9° C. (300° F.) and greater, the settling out of the weighting agent is accelerated due to the thermal decomposition of suspending agents present in the non-aqueous-base packer fluids.) Penetrating such plugs makes workover operations extremely costly and difficult.

Conventional non-aqueous-base drilling fluids are also not suitable for use as completion fluids. For example, non-aqueous-base drilling fluids are commonly brine-in-oil emulsions and emulsifiers, which are present in such emulsions, can produce detrimental formation wettability changes. Moreover, the numerous ingredients present in conventional non-aqueous-base drilling fluids cause plugging and other types of damage to the formation. In addition, emulsified brine droplets can plug subterranean formations.

SUMMARY OF THE INVENTION

Accordingly, solutions to the foregoing problems are needed. In particular, in order to make the benefits of non-aqueous-base drilling fluids more accessible, the complexity and cost of such fluids need to be reduced. In addition, there is a need for non-aqueous-base, high density (such as about 2.2 g/cc (18 pounds per gallon (ppg) or more) packer fluids that are capable of keeping solids suspended longer. There is also a need for (i) non-aqueous-base completion fluids having a relatively low solids content and (ii) other improved non-aqueous-base wellbore fluids.

The present invention solves these needs by providing simple, relatively inexpensive, non-aqueous-base wellbore fluids (e.g., drilling, packer, and completion fluids) and methods and systems employing such wellbore fluids. For example, in one embodiment, the present invention substantially reduces the complexity and cost of drilling fluids by using one or more viscosifying/fluid loss agents capable of (i) significantly increasing the suspending capacity of non-aqueous fluids in the absence of materials (such as water, polar activators, emulsifiers, and lime) used to enhance the efficacy of previously used viscosifying agents and (ii) lowering the fluid loss of the non-aqueous wellbore fluids. To illustrate, a composition comprising 96 weight percent of a non-aqueous fluid (e.g., a natural or synthetic hydrocarbon (such as dodecane)) and 4 weight percent of the viscosifying/fluid loss agent has (a) a 3 rotations per minute (rpm) dial reading of at least about 2 and/or (b) a 6 rpm dial reading of at least about 4 and/or (c) a yield point of at least about 10 cp (10 Pa·s). (When a numerical range is specified in the specification, the range inherently includes all whole and mixed numbers therein. Therefore, to save space, for each range given in the specification, all whole and mixed numbers within the limits of the range are incorporated herein by reference.)

In the specification and claims, the 3 and 6 rpm readings are determined by taking the 3 and 6 rpm measurements, respectively, using a Fann 35A brand, 6 speed, viscometer of a composition held at a temperature of 48.9° C. (120° F.) and containing 96 weight percent non-aqueous fluid and 4 weight percent viscosifying/fluid loss agent.

In the specification and claims, the yield points are determined by analyzing a composition held at a temperature of 48.9° C. (120° F.) and containing 96 weight percent non-aqueous fluid and 4 weight percent viscosifying/fluid loss agent in accordance with the method described in API Recommended Practice, Standard Procedure for Field Testing Drilling Fluids, API RP 13B, Tenth Edition, American Petroleum Institute, Production Department, Dallas, Texas (June 1, 1984) (hereinafter referred to as "API RP 13B"), Section 2, Viscosity and Gel Strength, pages 6–8. API RP 13 B is incorporated herein in its entirety by reference.

In addition, as noted above, the viscosifying/fluid loss agent helps prevent fluid loss. For example, a composition comprising 10 weight percent REV DUST, 10 weight percent weighting agent, 77 weight percent non-aqueous fluid, and 3 weight percent viscosifying/fluid loss agent has a fluid loss of about 5 ml or less.

In the specification and claims, the fluid loss is measured by subjecting a composition containing 10 weight percent REV DUST brand simulated drilling cuttings, 10 weight percent weighting agent, 77 weight percent non-aqueous fluid, and 3 weight percent viscosifying/fluid loss agent to the low-temperature/low-pressure filtration test described in API RP 13 B, Section 3, Filtration, subsections 3.2 through 3.3, pages 9–10. REV DUST is described below in Appendix 1.

By incorporating the foregoing viscosifying/fluid loss agents into other wellbore fluids (e.g., completion fluids, workover fluids, packer fluids, spotting fluids, coring fluids, perforating fluids, gravel packing fluids, and hydraulic fracturing fluids) one or more deficiencies encountered in (i) completion, workover, packing, spotting, coring, perforating, gravel packing, and hydraulic fracturing methods employing such fluids and (ii) natural resource production systems containing such fluids can be significantly reduced and, in some cases, even totally eliminated.

With respect to particular drilling fluid embodiments of the invention, in one version, the drilling fluid comprises (A) the non-aqueous fluid, (B) the viscosifying/fluid loss agent, and, optionally, (C) one or more ingredients selected from the group consisting of weighting agents, dimers of fatty acids, trimers of fatty acids, fluid loss control additives, lost circulation materials, polystyrene, organophilic clays, and mixtures thereof. In a second version, the drilling fluid comprises (A) a total non-aqueous fluid concentration of at least about 50 weight percent, (B) a total viscosifying/fluid loss agent concentration of about 0.1 to about 10 weight percent, (C) a total weighting agent concentration of up to about 45 weight percent, and (D) a total concentration of all ingredients selected from the group consisting of dimers of fatty acids, trimers of fatty acids, fluid loss control additives, lost circulation materials, polystyrene, organophilic clays of about 114.4 kg/m$^3$ (40 pounds per barrel (ppb)) or less. In a third version, the drilling fluid comprises (A) the non-aqueous fluid, (B) the viscosifying agent, and (C) a total concentration of all ingredients selected from the group consisting of lime, shale inhibiting salts, surfactants (e.g., emulsifiers, wetting agents), calcium carbonate, thinners, supplemental viscosifiers (i.e., viscosifiers other than organophilic clay and non-organophilic clay) of about 14.3 kg/M$^3$ (5 ppb) or less and has a non-aqueous fluid to water ratio of at least about 95:5. In a fourth version, the drilling fluid consists of or consists essentially of (A) the non-aqueous fluid, (B) the viscosifying agent, (C) optionally one or more ingredients selected from the group consisting of weighting agents, dimers of fatty acids, trimers of fatty acids, fluid loss control additives, lost circulation materials, polystyrene, organophilic clays, and mixtures thereof, and (D) drill cuttings.

When used as a drilling fluid to drill a borehole in a subterranean formation, the drilling method comprises the steps of (a) rotating a drill bit in the borehole and (b) introducing the drilling fluid into the borehole (i) to pick up drill cuttings and (ii) to carry at least a portion of the drill cuttings out of the borehole. The drilling system employed in such method comprises (a) the subterranean formation, (b) the borehole penetrating the subterranean formation, (c) the drill bit suspended in the borehole, and (d) the drilling fluid located in the borehole and proximate the drill bit.

When a weighted drilling fluid is not required, the non-aqueous fluid and the viscosifying/fluid loss agent can be the sole constituents present in the drilling fluid.

The drilling fluid of the present invention has many advantages over prior non-aqueous-base drilling fluids including, but not limited to, the following:

1. Significantly lowers the cost of non-aqueous-base drilling fluids by eliminating or greatly reducing the use of some of the more costly ingredients.
2. Reduces the number of components from 9–14 to generally 2–3, thus (a) greatly simplifying non-aqueous-base drilling fluids, thereby (i) cutting the cost of drilling services due to the fact that drilling support becomes more of a commodity and less of a black art, (ii) slashing mud maintenance costs, and (iii) lowering manpower requirements; and (b) reducing space (especially rig space) required to store components.
3. Makes non-aqueous-based drilling fluids more available for drilling longer sections of a well and for also drilling more wells because non-aqueous-base fluids can now compete cost-wise with water-base fluids.
4. Allows non-aqueous-base drilling fluids to double as completion and/or packer fluids because they (i) are less damaging and (ii) suspend weighting agents better than conventional non-aqueous-base drilling fluids.
5. Lowers overall toxicity of non-aqueous-base drilling fluids by greatly reducing, and in some cases totally eliminating, the use of additives that may impart toxicity.
6. May reduce drilling fluid-related wellbore problems.
7. May be more thermally stable.
8. Increases the rate of penetration ("ROP") due to the drilling fluid having a lower solids concentration.
9. Reduces the equivalent circulating density ("ECD") which reduces loss circulation of the drilling fluid and enables slimmer wellbores to be drilled.

When the wellbore fluid of the present invention is a packer fluid, the method of the invention comprises the step of setting a packer in the presence of the packer fluid. The resulting natural resource production system comprises (a) a borehole penetrating the surface of the ground and at least a portion of a subterranean formation, (b) a conduit (or pipe or tubing or other means for transporting the natural resource from the subterranean formation to surface) axially positioned in the borehole, (c) the packer (or other means for segregating at least a portion of the lower part of the borehole from at least a portion of the upper part of the borehole) positioned in the borehole in the area between the inner surface of the borehole and the exterior surface of the conduit, and (d) the packer fluid of the present invention located in the borehole in the area between the inner surface of the borehole and the exterior surface of the conduit and above the upper surface of the packer.

In the case of gravel packing, the gravel packing fluid of the invention comprises (A) the non-aqueous fluid, (B) the viscosifying/fluid loss agent, and (C) a gravel packing agent, and the gravel packing method of the invention comprises the step of injecting the gravel packing composition into a well. The resulting gravel packed well comprises (a) a borehole penetrating the surface of the ground and at least a portion of a subterranean formation, (b) a well casing situated in at least a portion of the borehole in the direction of the borehole axis, and (c) the gravel packing fluid of the present invention located in at least a portion of the borehole.

With respect to hydraulic fracturing fluids, the hydraulic fracturing fluid of the invention generally comprises (A) the non-aqueous fluid, (B) the viscosifying/fluid loss agent, and (C) a proppant, and the hydraulic fracturing method of the invention entails the steps of (a) injecting the hydraulic fracturing fluid under pressure into a subterranean formation through a borehole and (b) creating a fracture or fracture system in the subterranean formation. However, a proppant need not be present when the fracturing fluid is used in unpropped jobs. The system formed as a result of a hydraulic fracturing treatment comprises (a) a subterranean formation having a hydraulic fracture present therein, (b) a borehole penetrating the subterranean formation and intersecting the hydraulic fracture, and (c) the hydraulic fracturing fluid of the invention present in the fracture.

Other methods (e.g., completion, workover, spotting, coring, and perforating operations) employing the wellbore fluids of the present invention generally comprise the step of injecting the wellbore fluid into a well to form a system comprising (a) a borehole penetrating the surface of the ground and at least a portion of a subterranean formation, (b) a well casing situated in at least a portion of the borehole in the direction of the borehole axis, and (c) the wellbore fluid of the present invention located in at least a portion of the borehole.

DETAILED DESCRIPTION OF THE INVENTION

I. The Connecting Thread

All of the wellbore fluids of the present invention have at least two things in common, they each contain one or more non-aqueous fluids and one or more viscosifying/fluid loss agents meeting the criteria specified below. With respect to the non-aqueous fluids, the non-aqueous fluid can be virtually any organic liquid.

As used in the specification and claims, the term "organic liquid" means a material that (a) is a liquid at 22° C. and (b) is composed of a plurality of compounds (which can all be the same or which one or more can be different) where at least about 50 weight percent of the constituent compounds contain one or more carbon atoms.

Typical non-aqueous fluids include, but are not limited to, hydrocarbons such as synthetics (e.g., paraffinic solvents (such as Fischer-Tropsh synthesized products), polyalphaolefins, internal alphaolefins, linear alphaolefins, organic esters (especially vegetable esters), ethers, polybutylenes, polyisobutylenes, glycols, and dodecane, oils (e.g., diesel, gasoline, kerosene), and mineral oils (e.g., white mineral oils).

As used in the specification and claims, the term "synthetics" means materials produced by the reaction of specific purified chemical feedstock, as opposed to the traditional base fluids such as diesel and mineral oil which are derived from crude oil solely through physical separation processes such as fractionation and distillation and/or minor chemical reactions (e.g., cracking and hydroprocessing). Since they are synthesized by the reaction of purified compounds, synthetics are typically free of aromatic compounds.

As used in the specification and claims, the term "mineral oils" means petroleum distillates which have been purified and are distinguished from diesel oil in having a lower aromatic content.

Since it is important to use the utmost effort to avoid adversely impacting the environment, the non-aqueous fluid is preferably a synthetic. Commercially available, non-toxic synthetics include Saraline brand, Sarasol brand, and Sasol brand paraffinic fluids, Novadril brand polyalphaolefin, Novaplus brand internal alphaolefin, and Petrofree brand organic ester. Due to their low cost, very favorable bioassay test results, and excellent rheological properties, the most preferred synthetic is Saraline brand paraffinic fluid such as described in U.S. Pat. No. 5,635,457 and U.S. application Ser. No. 08/494,441 now abandoned and U.S. application Ser. No. 08/580,112, which documents are incorporated herein in their entireties by reference.

Regarding the viscosifying/fluid loss agent employed in the invention, a composition containing the viscosifying/fluid loss agent and a non-aqueous fluid (and sometimes additional ingredients as well), at a minimum, must meet certain performance criteria such as 3 and 6 rpm readings, yield point, and fluid loss. Since the suspending capacity and desirability of the viscosifying/fluid loss agent increases as the 3 and 6 rpm readings and yield point of the composition increase, the higher the 3 and 6 rpm readings and yield point of the composition the better, all other parameters being equal. Generally, the viscosifying/fluid loss agent-containing composition has a 3 rpm reading of at least 2 and/or a 6 rpm reading of at least 4 and/or a yield point of at least about 10 Pa·s (10 cp). Accordingly, as the 3 and/or 6 rpm readings and/or yield point of the composition containing a viscosifying/fluid loss agent and a non-aqueous fluid increase, the concentration of that viscosifying/fluid loss agent in that non-aqueous fluid required to achieve a desired suspending level capacity decreases.

In addition, it is also preferred that a composition containing 96 weight percent non-aqueous-base fluid and 4 weight percent viscosifying/fluid loss agent remain substantially homogenous (i.e., not exhibit any top oil separation) after standing at room temperature (i.e., 22° C.) for a period of at least 24 hours, more preferably at least 48 hours, even more preferably 72 hours, and most preferably at least 96 hours. In fact, the composition generally remains substantially homogenous for periods of seven days and even longer.

Furthermore, since environmental impact is very important, the viscosifying/fluid loss agent preferably has a NFPA 704 Health Hazard Rating of 0 or 1 as described in *NFPA 704 Standard System for the Identification of the Hazards of Materials for Emergency Response*, 1996 Edition, National Fire Protection Association, Quincy, Massachusetts (1996) (hereinafter referred to as the "NFPA 704 Standard", the NFPA 704 Standard being incorporated herein in its entirety by reference), Chapter 2, Section 2–3.1, pages 704-5 through 704-6.

Various materials meet the foregoing performance and NFPA 704 Health Hazard Rating criteria and can be used as the viscosifying/fluid loss agent. These materials include certain thermoplastic elastomers and vegetable oil derivatives. Exemplary thermoplastic elastomers suitable for use in the present invention include, but are not limited to, block copolymers such as described in U.S. Pat. No. 5,559,165, U.S. Pat. No. 5,548,030, U.S. Pat. No. 5,543,448, U.S. Pat. No. 5,510,072, U.S. Pat. No. 5,492,967, U.S. Pat. No. 5,486,574, U.S. Pat. No. 5,455,075, U.S. Pat. No. 5,447,775, U.S. Pat. No. 5,393,841, U.S. Pat. No. 5,370,813, U.S. Pat. No. 5,324,782, U.S. Pat. No. 5,304,599, U.S. Pat. No. 5,258,457, U.S. Pat. No. 5,278,220, U.S. Pat. No. 5,262,480, U.S. Pat. No. 5,252,476, U.S. Pat. No. 5,248,728, U.S. Pat. No. 5,247,014, U.S. Pat. No. 5,221,534, U.S. Pat. No. 5,190,986, U.S. Pat. No. 5,130,340, U.S. Pat. No. 5,124,405, U.S. Pat. No. 5,120,801, U.S. Pat. No. 5,106,917, U.S. Pat. No. 5,104,733, U.S. Pat. No. 5,093,422, U.S. Pat. No. 5,026,752, U.S. Pat. No. 5,015,695, U.S. Pat. No. 5,000,897, U.S. Pat. No. 4,972,021, U.S. Pat. No. 4,966,946, U.S. Pat. No. 4,880,878, U.S. Pat. No. 4,869,966, U.S. Pat. No. 4,822,857, U.S. Pat. No. 4,798,853, U.S. Pat. No. 4,783,504, U.S. Pat. No. 4,749,430, U.S. Pat. No. 4,692,557, U.S. Pat. No. 4,687,815, U.S. Pat. No. 4,584,338, U.S. Pat. No. 4,425,459, and U.S. Pat. No. 4,286,077, which patents and their corresponding foreign counterparts are incorporated herein in their entireties by reference.

In one version of the invention, the viscosifying/fluid loss agent is a thermoplastic elastomer or rubber in which the polymer chains have either a tri-block, di-block, or multiarm configuration. The tri-block rubbers have poly(vinylaromatic) (e.g., polystyrene) segments (S) on the ends of the molecule and a rubber segment in the center. In some instances, the elastomeric portion of these polymers is a saturated olefin rubber (e.g., ethylene/butylene (EB), ethylene/propylene (EP)). In other instances, the rubber segment is unsaturated (e.g., butadiene (B), isoprene (I)). Due to their saturated nature, molecules containing a saturated olefin rubber are very stable at elevated temperatures.

One class of block copolymers has the formula:

where m is 0, 1, 2, 3, or 4, A is a saturated polyalkylene, and S is a polymerized vinyl aromatic. The copolymer therefore has from one to five vinyl aromatic blocks. Accordingly, the structure of the copolymer varies in accordance with the value of m. When m is 0, the copolymer is a di-block comprising a single vinyl aromatic block and a single polyalkylene block. When m is 1, the two polyalkylene blocks can be considered as a single block, and the copolymer comprises a tri-block with polystyrene blocks on each side of the polyalkylene block. When m is 2 to 4, the copolymer is either multi-blocked, branched, or "star shaped". The blocks can also be linear, with two or more of each type of block.

The polyalkylene blocks can comprise any of a wide variety of saturated polyalkylenes. Representative examples include polyethylene, polypropylene, poly(ethylene-propylene), polybutylene, poly(ethylene-butylene) and combinations thereof. The polyalkylene blocks are generally hydrogenated conjugated diolefin blocks. Hydrogenated conjugated diolefin blocks are commonly referred to as polyalkylenes because they structurally resemble polymerized alpha olefins, although alpha olefins are not anionically polymerizable and cannot be polymerized into well defined block copolymers. Isoprene typically polymerizes to form a polymer which, after hydrogenation, resembles alternating ethylene-propylene units. Butadiene can be polymerized by 1–4 addition to resemble ethylene units, by 1–2 addition to resemble butylene units, or by a combination of 14 and 1–2 addition to resemble an ethylene-butylene polymer.

The vinyl aromatic blocks comprise a plurality of vinyl aromatic monomers. The vinyl aromatic is typically styrene, but may alternatively be substituted with a non-reactive group. Examples of acceptable vinyl aromatics include, along with styrene, alpha-methyl styrene and ring alkylated styrenes, and other monoalkenyl polycyclic aromatic compounds such as vinyl naphthalene and the like.

The polymeric blocks comprise predominantly monomers of the class which characterize the block, but may include other monomers. The additional monomers may be incorporated in either random or a tapered manner. The blocks are usually essentially homopolymer blocks or copolymer blocks of monomers from the class of monomers which characterize the block.

Another block copolymer class has a number average molecular weight of at least 120,000 and comprises at least two blocks predominantly derived from a monoalkylene aromatic monomer and at least one block predominantly derived from one or more conjugated dienes.

The poly(monoalkenylaromatic) blocks are predominantly derived from styrene, alphamethylstyrene, tert.-butylstyrene, 4-propylstyrene, paramethylstyrene, other ring alkylated styrenes, 1-vinylnaphthalene, or 2-vinylnaphthalene as well as mixtures thereof.

The poly(conjugated diene) block is predominantly derived from 1,3-butadiene, 2-methyl-1,3-butadiene (isoprene), 2,3-dimethyl-1,3-butadiene, 1,3-pentadiene, or 1,3-hexadiene as well as mixtures thereof.

As used in the specification and claims, "predominantly derived from" means that the starting monoalkenyl aromatic monomer or monomers may be optionally mixed with a minor amount (<20% by weight) of a conjugated diene comonomer (e.g., a conjugated diene is incorporated in the poly(conjugated diene) block(s)) or that the starting conjugated diene monomer or monomers may be optionally mixed with minor amounts (<20% by weight) of a monoalkenyl aromatic comonomer (e.g., the monoalkenyl aromatic monomer is incorporated into the poly(monoalkenylaromatic) blocks).

As used in the specification and claims, "apparent molecular weight" means the molecular weight as determined by gel permeation chromatography using polystyrene standards by construing a calibration curve.

As used in the specification and claims, "substantially pure selectively hydrogenated block copolymers" means hydrogenated block copolymers free from any significant amounts of other structurally not related polymers or usual auxiliaries. Depending on the specific preparation route of the initial tri-block copolymers to be hydrogenated, the final tri-block copolymer mixtures comprise tri-block copolymers alone or tri-block copolymers mixed with a minor amount of selectively hydrogenated terminated precursor di-block, from which the starting tri-block has been derived by coupling.

As used in the specification and claims, "selectively hydrogenated block copolymers" means block copolymers where the predominantly poly(conjugated diene) blocks have been hydrogenated to a residual unsaturation degree of at most 20%, whereas at most 25% of the aromatic double bonds from the vinylaromatic monomers have been hydrogenated.

The predominantly poly(monovinylaromatic) blocks of the block copolymers have an apparent molecular weight in the range from about 5,000 to about 125,000.

The predominantly poly(conjugated diene) blocks, in the starting block copolymers, have an apparent molecular weight in the range from about 10,000 to about 300,000 and have a vinyl content of about 20 to about 45% relative to the conjugated diene molecules.

The bound monoalkenyl aromatic content of the complete block copolymer is normally in the range of from about 20 to about 70% by weight.

The apparent molecular weight of the total block copolymer will often be in the range of about 100,000 to about 350,000.

A further class of block polymers comprises polystyrene-hydrogenated polyisoprene-polystyrene-hydrogenated polyisoprene block copolymers, where the polystyrene endblocks have a peak molecular weight from about 4,500 to about 8,000, the hydrogenated polyisoprene midblocks have a peak molecular weight from about 35,000 to about 55,000, the polystyrene midblocks have a peak molecular weight from about 4,500 to about 9,000, and the hydrogenated polyisoprene endblocks have a peak molecular weight that is from about 15% to about 35% of the peak molecular weight of the hydrogenated polyisoprene midblocks. The hydrogenated polyisoprene blocks generally have a residual unsaturation less than about 5% and may have from 30% to 100% 1,4-addition of the isoprene.

Another block polymer class comprises hydrogenated block copolymers having at least two blocks, designated A, of a polymerized vinyl aromatic compound (e.g., styrene or analogs or styrene such as alpha-methylstyrene or ring methylated styrenes including p-methylstyrene and o-methylstyrene) and at least one block, designated B, of a polymerized conjugated alkadiene (e.g., butadiene or isoprene but copolymers with a vinyl aromatic compound are also suitable so long as the B block is predominantly conjugated alkadiene units). The hydrogenated block copolymer has from about 8% by weight to about 55% by weight of the polymerized vinyl aromatic compound blocks A, with the remainder being polymerized alkadiene block B. Each of such A blocks has an average molecular weight from 5,000 to about 125,000. Each B block has an average molecular weight from about 10,000 to about 300,000. In the case of butadiene, polymerization to give polymer units having a 1,2-structure or a 1,4-structure is possible. Illustrative of the hydrogenated block copolymer are hydrogenated derivatives of the following block copolymers:
polystyrene-polybutadiene-polystyrene (SBS)
polystyrene-polyethylene-polybutadiene-polystyrene
polystyrene-polyisoprene-polystyrene (SIS)
poly(alpha-methylstyrene)polybutadiene-poly(alpha-methylstyrene)
poly(alpha-methylstyrene)polyisoprene-poly(alpha-methylstyrene).

The hydrogenated block copolymers have average molecular weights on the order of about 25,000 to about 350,000 and substantially complete (at least about 80%) hydrogenation of the aliphatic unsaturation of the B block while very little (less than about 25%) of the aromatic unsaturation of the A blocks.

Block copolymers are also selected from the class comprising hydrogenated di-block copolymers A-B having a number average molecular weight in the range of 50,000 to 800,000 and a content of the alkenyl substituted aromatic in the range of about 20 to 40% by weight. Generally, the di-block copolymer comprises one polystyrene block or random polymer block derived from predominantly styrene and a minor amount of conjugated diene, and one block of polyisoprene or poly-1,3-butadiene which has been hydrogenated after the polymerization to at least 80 mol % of the original unsaturation in the polybutadiene or polyisoprene block.

The block copolymer generally has a molecular weight distribution of about 1.0 to 1.5.

Polymer blocks A are prepared from, for example, styrene, alpha-methylstyrene, 2,4-dichlorostyrene, p-methoxystyrene, p-methylstyrene, 3,4-dimethylstyrene, p-tert-butylstyrene, p-phenylstyrene, p-acetoxystyrene, m-tert-butylstyrene, p-phenylstyrene, p-acetoxystyrene, divinylbenzene, 1-vinylnaphthalene, 3,5-diethylstyrene, 4-n-propylstyrene, 2,4,6-trimethylstyrene, 4-p-tolylstyrene, 3,5-diphenylstyrene, 3-ethyl-vinylnaphthalene, 8-phenyl-1-vinylnaphthalene, or mixtures thereof.

Polymer blocks B are prepared from, for example, 1,3-butadiene, 2-methyl-1,3-butadiene (isoprene), 1,3-pentadienes (piperylenes), 2,3-dimethyl-1,3-butadiene, 2-methyl-1,3-pentadiene, 2,3-dimethyl-1,3-pentadiene, 2-phenyl-1,3-butadiene, 1-phenyl-1,3-butadiene, or mixtures thereof.

Another class of block polymers that can be used as the viscosifying/fluid loss agent comprises hydrogenated multiarmed polymers such as $(A-B)_a-Y-(C-A)_b$ or $(A-B)_x-Y-C_y$ where A is a poly(monoalkenylarene) block, B and C are poly(conjugated diene) blocks, Y is the residue of a multifunctional coupling agent, and a, b, c, and d are integers. If A is styrene, B is isoprene, C is butadiene, these structure would be, for example, $(S-I)a-Y-(B-S)_b$ or $(S-I)_x-Y-B_y$.

Commercially available block thermoplastic elastomers include the Kraton brand polymers from Shell Chemical Company such as those described in the following Tables I and II. (Tables I and II are abstracted from Shell Chemical Company Technical Bulletin SC: 1102-89, KRATON® Thermoplastic Rubbers in Oil Gels (April 1989), which publication is incorporated herein in its entirety by reference. Additional information regarding KRATON polymers can be found in KRATON® Thermoplastic Rubber, SC: 519-93 (August/93) and SC: 414-96, which publications are incorporated herein in their entireties by reference and available from the Shell Chemical Company, Houston, Tex.)

TABLE 1

| | Kraton G Rubber Grades | | | | | | | | |
|---|---|---|---|---|---|---|---|---|---|
| Property | G1650 | G1651 | G1652 | G1657X | G1701X | G1702X | G1726X | G1750X | G1765X |
| Composition[a] | SEBS | SEBS | SEBS | SEBS | SEP | SEP | SEB[c] | EP | EP |
| Predominant architecture[b] | JB | TB | TB | TB | DB | DP | DB/JBC | MA | MA |
| Relative MW | Medium | High | Low | Medium | High | High | Low | High | High |
| Styrene/rubber ratio | 29/71 | 32/68 | 29/71 | 13/87 | 37/63 | 28/72 | 30/70 | 0/100 | 0/100 |
| Glass transition temperature of rubber block, °C. | −56 | −55 | −55 | −55 | −55 | −55 | −55 | −55 | −55 |
| Physical form | Powder | Powder | Powder | Pellet | Powder | Powder | Pellet | Slab | Slab |

[a]"SEBS" denotes styrene-ethylene/butylene-styrene block copolymer. "SEP" denotes styrene-ethylene/propylene block copolymer. "EP" denotes ethylene/propylene block copolymer.
[b]"TB" denotes tri-block. "DB" denotes di-block. "MA" denotes multiarm.
[c]70% SEB and 30% SEBS.

TABLE II

| | KRATON D Rubber Grades | | |
|---|---|---|---|
| Property | D-1101 | D-1102 | D-1107 |
| Composition[a] | SBS | SBS | SIS |
| Predominant architecture[b] | TB | TB | TB |
| Relative MW | Medium | Low | Medium |
| Styrene/rubber ratio | 31/69 | 28/72 | 14/86 |
| Glass transition temperature of rubber block, ° C. | −85 | −85 | −60 |
| Physical form[c] | PP | PP | DP |

[a]"SBS" denotes styrene-butadiene-styrene block copolymer. "SIS" denotes styrene-isoprene-styrene block copolymer.
[b]"TB" denotes tri-block.
[c]"PP" denotes porous pellet and "DP" denotes dense pellet.

Exemplary vegetable oil derivatives that meet foregoing performance and NFPA 704 Health Hazard Rating criteria, and therefore can be used as the viscosifying/fluid loss agent, are Thixcin R brand and Troythix XYZ brand glyceryl tris 12-hydroxystearate which are available from Reox Inc. and Troy Chemical Inc., respectively.

Since the concentration of the non-aqueous fluid and viscosifying/fluid loss agent in the wellbore fluids of the present invention varies depending on the specific type of wellbore fluid and its intended use, these parameters are described below in connection with each of the particular wellbore fluids discussed.

II. Drilling Fluids

In addition to the non-aqueous fluid and the viscosifying/fluid loss agent, the drilling fluids of the present invention contain one or more weighting agents when needed to achieve a desired density. Any weighting agent can be employed and exemplary weighting agents include, but are not limited to, barite (density: 4.5 g/cc), hematite (i.e., iron oxide; density: 5.12 g/cc), galena, siderite, and calcium carbonate (density: 2.7 g/cc). Since dense weighting agents occupy less space, the density of the weighting agent is preferably about 4 g/cc or greater. Generally, the density of the weighting agent is from about 4 to about 6 g/cc. Barite is usually the preferred weighting agent.

The concentration of the various ingredients used in the drilling fluid depends on the fluid's desired density. For example, the following Table III sets forth various drilling fluid formulations in which the non-aqueous fluid is Saraline brand synthetic paraffinic fluid, the viscosifying/fluid loss agent is KRATON® G1702 brand elastomeric thermoplastic polymer, and the weighting agent is barite.

Except for drill cuttings and other subterranean materials that become incorporated into the drilling fluid as a result of drilling operations, the drilling fluid can consist of just the non-aqueous fluid, the viscosifying/fluid loss agent, and (when needed) the weighting agent. While the actual concentrations of the non-aqueous fluid and the weighting agent are somewhat dictated by the desired density of the drilling fluid, in general, the drilling fluid contains a total non-aqueous fluid concentration of at least about 50 weight percent and a total weighting agent concentration of up to about 45 weight percent. The total viscosifying/fluid loss agent concentration in the drilling fluid is commonly from about 0.01 to about 10, more commonly from about 0.1 to about 7, and most commonly from about 0.5 to about 5, weight percent. The concentration of the viscosifying/fluid agent is also somewhat a function of the desired density of the drilling fluid, with denser drilling fluids generally having lower viscosifying/fluid loss agent concentrations. However, regardless of the drilling fluid's density, the total viscosifying/fluid loss agent concentration is often about 4 or less, more often about 3 or less, and quite often about 2 or less, weight percent.

Dimers and/or trimers of fatty acids can optionally be employed to improve low end rheology of the drilling fluid. In fact, such dimers and/or trimers appear to synergistically improve the low end rheology of the drilling fluid when the non-aqueous fluid is a synthetic such as a paraffinic solvent produced by a Fischer-Tropsh process. When used, the total concentration of the dimers and the trimers of fatty acids present in the drilling fluid is generally about 0.5 to about 5, more typically about 0.1 to about 2, and most typically about 0.2 to about 1, weight percent.

Also, while they are not considered to be necessary and can, in fact be totally absent, convention viscosifiers (such as organophilic clays and non-organophilic clays) are also optionally present in the drilling fluid. If used, the total convention viscosifier concentration is usually up to about 6, more commonly about 0.2 to about 4, and most commonly about 0.4 to about 3, weight percent. However, organophilic clays and non-organophilic clays appear to synergistically interact with the viscosifying/fluid loss agents meeting the performance criteria specified herein to reduce fluid loss. This apparent phenomenon is believed to result from the viscosifier/fluid loss agent forming a crosslinked network onto which the organophilic and non-organophilic clay particles attach, thereby creating a filter cake that prevents and/or reduces fluid loss from the drilling fluid.

When certain adverse circumstances are encountered during drilling operations, it may be desirable to incorporate

TABLE III

Drilling Fluid Compositions

| | Concentration | | | | | | | | |
|---|---|---|---|---|---|---|---|---|---|
| | 6.67 ppg[a] Fluid | | | 10 ppg Fluid | | | 19 ppg Fluid | | |
| Ingredient | ppb[b](kg/m³) | wt %[c] | vol %[d] | ppb(kg/m³) | wt % | vol % | ppb(kg/m³) | wt % | vol % |
| Saraline | 271.13(773.5) | 97 | 97.35 | 238.1(679.3) | 57 | 85.1 | 149.8(427.4) | 18.7 | 53.5 |
| Kraton G1702 | 8.45(24.1) | 3 | 2.65 | 12.53(35.7) | 3 | 3.9 | 14.2(40.5) | 1.8 | 4.5 |
| Barite | 0(0) | 0 | 0 | 167.1(476.7) | 40 | 11 | 639(1,823.1) | 79.6 | 42 |

[a]"ppg" denotes pounds per gallon.
[b]"ppb" denotes pounds per barrel.
[c]"wt %" denotes weight percent.
[d]"vol %" denotes volume percent.

one or more other ingredients into the drilling fluid. For example, when a loss circulation or thief zone is present, a loss circulation material can be added to the drilling fluid. Similarly, if the drilling fluid is experiencing an unacceptably high fluid loss, a fluid loss control agent can be added. In addition, when subjected to elevated temperature (e.g., temperature above about 176.7° C. (350° F.)), a high temperature viscosifying agent (such as polystyrene) can be added to enhance the stability of the drilling fluid. Also, when the drilling fluid is subjected to a massive water influx, an emulsifier or surfactant can be added. However, even in the most adverse situation, the total concentration of all ingredients present in the drilling fluid (other than the non-aqueous fluid, the viscosifying/fluid loss agent meeting the performance criteria specified herein, the weighting agent, and drill cuttings) is about 114.4 kg/m$^3$ (40 ppb) or less. However, in most adverse situations, the total concentration of such ingredients present in the drilling fluid is generally about 85.8 kg/m$^3$ (30 ppb) or less, more commonly about 57.2 kg/m$^3$ (20 ppb), even more commonly about 42.9 kg/m$^3$ (15 ppb) or less, and most commonly about 28.6 kg/m$^3$ (10 ppb) or less. In fact, it is not unusual for the total concentration of all such ingredients in the drilling fluid to be about 14.3 kg/m$^3$ (5 ppb) or less.

When an adverse situation is not encountered, there is no need for any loss circulation material, fluid loss control agent, or high temperature viscosifying agent to be present in the drilling fluid. In addition, there is never any need for water, lime, shale inhibiting salt (e.g., calcium chloride, sodium chloride), calcium carbonate, thinner, or polar activator to be present in the drilling fluid. Accordingly, the total concentration of all ingredients present in the drilling fluid (other than the non-aqueous fluid, the viscosifying/fluid loss agent meeting the performance criteria specified herein, the weighting agent, and drill cuttings) is commonly about 5.72 kg/m$^3$ (2 ppb) or less, more commonly about 2.86 kg/m$^3$ (1 ppb) or less, even more commonly about 1.43 kg/m$^3$ (0.5 ppb) or less, and most commonly about 0.286 kg/m$^3$ (0.1 ppb) or less. Frequently the concentration of any such ingredient (or, for that matter, all such ingredients) in the drilling fluid is about 0.143 kg/m$^3$ (0.05 ppb) or less, more frequently about 0.0286 kg/m$^3$ (0.01 ppb) or less, even more frequently about 0.0143 kg/m$^3$ (0.005 ppb) or less, and most frequently 0.00286 kg/m$^3$ (0.001 ppb) or less. In fact, the drilling fluid is quite often totally devoid of most, if not all, of such ingredients.

The drilling fluid is prepared by mixing the non-aqueous fluid with the viscosifying/fluid loss agent. If a weighting agent is used, it is usually added to the resulting composition. Other optional ingredients, when required, are generally added to the foregoing formulation.

III. Packer and Completion Fluids

The drilling fluid described in the preceding section II can also be used as a packer and/or a completion fluid using techniques such as those disclosed in Allen et al., *Production Operations. Well Completions, Workover. and Stimulation*, Volumes 1 and 2, Oil & Gas Consultants International, Inc., Tulsa, Okla. (1989) (hereinafter referred to as "Allen"; Allen being incorporated herein in its entirety by reference).

IV. Hydraulic Fracturing Fluid

A composition comprising at least one of the non-aqueous fluids, at least one of the viscosifying/fluid loss agents, and (optionally) at least one proppant can be used as a hydraulic fracturing fluid in accordance with the techniques noted in Allen as well as Howard et al., *Hydraulic Fracturing*, Society of Petroleum Engineers of AIME, New York, N.Y. (1970) (hereinafter referred to as "Howard"; Howard being incorporated herein in its entirety by reference).

Common proppants suitable for use in hydraulically fracturing subterranean formations are quartz sand grains, tempered glass beads, sintered bauxite, resin coated sand, aluminum pellets, and nylon pellets. Generally, the proppants are employed in the fracturing fluid in a concentration of about 120 to about 1,200 kg/m$^3$ (1 to 10 ppg) of fracturing fluid. The proppant size is typically less than about 2 mesh on the U.S. Sieve Series scale, with the exact size selected being dependent on the particular type of formation to be fractured, the available pressure and pumping rates, as well as other factors known to those skilled in the art.

V. Gravel Packing Fluid

The gravel packing fluid of the present invention comprises one or more of the non-aqueous fluids, one or more of the viscosifying/fluid loss agents, and one or more particulate agents and can be employed according to the methods described in Allen.

Typical particulate agents include, but are not limited to, quartz sand grains, glass beads, synthetic resins, resin coated sand, walnut shells, and nylon pellets. The gravel packing particulate agents are commonly used in concentrations of about 120 to about 2,400 kg/m$^3$ (1 to 20 ppg) of gravel packing fluid. The size of the particulate agent employed depends on the type of formation, the average size of the formation particles, and other parameters known to those skilled in the art. Generally, particulate agents of about 8 to about 70 mesh on the U.S. Sieve Series scale are used.

EXAMPLES

The following examples are meant to illustrate (not limit) the invention. Examples 1–6 demonstrate rheology and/or fluid loss of a number of drilling fluids within the scope of the invention. Comparative Examples A–B report the rheology of two drilling fluids outside the scope of the invention.

EXAMPLE 1

Rheology and Fluid Loss of Three Component Drilling Fluid

A drilling fluid comprising 77 weight percent Saraline brand paraffinic fluid, 3 weight percent Kraton G1702 brand thermoplastic elastomer, 10 weight percent barite, and 10 weight percent REV DUST brand simulated drill cuttings was prepared and its properties analyzed using the techniques noted in the footnotes to the following Table A. The results of the analysis are set forth in Table A.

TABLE A

| Parameter | Measurement/Result |
| --- | --- |
| 600 rpm dial reading$^a$ | 100 |
| 300 rpm dial reading$^a$ | 68 |
| 200 rpm dial reading$^a$ | 55 |
| 100 rpm dial reading$^a$ | 39 |
| 6 rpm dial reading$^a$ | 14 |
| 3 rpm dial reading$^a$ | 11 |

TABLE A-continued

| Parameter | Measurement/Result |
|---|---|
| Plastic Viscosity[b], | |
| cp: | 35 |
| Pa·s | 0.035 |
| Yield Point[b], | |
| lb/100 ft² | 36 |
| Pa | 17.24 |
| 10 Second Gel[b], | |
| lb/100 ft² | 11 |
| Pa | 5.27 |
| 10 Minute Gel[b], | |
| lb/100 ft² | 13 |
| Pa | 6.22 |
| Fluid Loss[c], ml in 30 minutes | 1.4 |

[a]Measured using a Fann 35A brand 6 speed, viscometer while holding the sample at a temperature of 48.9° C.
[b]Determined by analyzing drilling fluid held at a temperature of 48.9° C. in accordance with the method described in API RP 13B, Section 2, Viscosity and Gel Strength, pages 6–8.
[c]Determined by analyzing drilling fluid in accordance with the method described in API RP 13B, Section 3, Filtration, subsections 3.2 to 3.3, pages 9–10.

In addition, no settling of barite or free oil was observed after a period of one week.

The dial readings, plastic viscosity, and yield point data listed in above Table A indicate that a simplified drilling fluid within the scope of the present invention achieved very acceptable suspending capacity in the absence of materials (such as water, polar activators, emulsifiers, and lime) used in the prior art to enhance the efficacy of previously used viscosifying agents. In addition, the lack of a substantial difference between the 10 second gel and 10 minute gel data indicates that the simplified drilling fluid did not significantly gel over time. Therefore, in the event that a drilling operation has to be temporarily halted, the drilling operation can be readily restarted because the drilling fluid would not form an unacceptably stiff gel during the lull in operations. Also, the drilling fluid tested in Example 1 obtained a very acceptable low fluid loss without the use of a fluid loss additive.

EXAMPLES 2–6

Rheology of Other Fluids Within Scope of Invention

The five formulations set forth below in Table B were prepared and their properties analyzed using the techniques noted in the footnotes to the following Table C. The results of the analysis are set forth in Table C.

TABLE B

| Example | Non-aqueous Fluid, weight percent | Viscosifying Agent, weight percent |
|---|---|---|
| 2 | 98 wt % Saraline paraffinic fluid | 2 wt % Kraton G1702 |
| 3 | 96 wt % Saraline paraffinic fluid | 4 wt % Kraton G1702 |
| 4 | 96 wt % Peneteck brand white mineral oil | 4 wt % Kraton G1702 |
| 5 | 96 wt % No. 2 diesel | 4 wt % Kraton G1702 |
| 6 | 96 wt % Saraline paraffinic fluid | 2 wt % Kraton G1702
2 wt % Rheox Thixcin R brand vegetable oil derivative |

TABLE C

| | Measurement/Result | | | | |
|---|---|---|---|---|---|
| Parameter | 2[c] | 3[d] | 4[e] | 5[f] | 6[g] |
| 600 rpm dial reading[a] | 28 | 181 | 258 | >300 | 74 |
| 300 rpm dial reading[a] | 16 | 126 | 181 | 200 | 53 |
| 200 rpm dial reading[a] | 12 | 105 | 151 | 155 | 43 |
| 100 rpm dial reading[a] | 7 | 78 | 113 | 100 | 30 |
| 6 rpm dial reading[a] | 1 | 29.5 | 44 | 12 | 10 |
| 3 rpm dial reading[a] | 1 | 26 | 38.5 | 7 | 8.5 |
| Plastic Viscosity | | | | | |
| cp | 12 | 55 | 77 | >98 | 21 |
| Pa·s | 0.012 | 0.055 | 0.077 | >0.098 | 0.021 |
| Yield Point[b], | | | | | |
| lb/100 ft² | 4 | 71 | 104 | <57 | 32 |
| Pa | 1.9 | 34.0 | 49.8 | <27.3 | 15.3 |
| 10 Second Gel[b], | | | | | |
| lb/100 ft² | 1 | 24 | 37 | 5 | 8.5 |
| Pa | 0.5 | 11.5 | 17.7 | 2.4 | 4.1 |
| 10 Minute Gel[b], | | | | | |
| lb/100 ft² | 1 | 24 | 37 | 5 | 10.5 |
| Pa | 0.5 | 11.5 | 17 | 2.4 | 5.0 |
| Apparent Viscosity[b], | | | | | |
| cp | 14 | 90.5 | 129 | >150 | 37 |
| Pa·s | 0.014 | 0.0905 | 0.129 | >0.15 | 0.037 |

[a]Measured using a Fann 35A brand 6 speed, viscometer while holding the sample at a temperature of 48.9° C.
[b]Determined by analyzing drilling fluid held at a temperature of 48.9° C. in accordance with the method described in API RP 13B, Section 2, Viscosity and Gel Strength, pages 6–8.
[c]Sample was slightly thick and exhibited no settling after 24 hours.
[d]Sample was very thick and exhibited no settling or top oil separation after 24 hours.
[e]Sample was very thick and exhibited no settling or top oil separation after 24 hours.
[f]Sample was slightly thick and exhibited no settling or top oil separation after 24 hours.
[g]Sample was somewhat thick and exhibited a small amount of settling but no top oil separation after 24 hours.

The dial reading, plastic viscosity, and yield point data listed in above Table C indicate that the tested simplified drilling fluids within the scope of the present invention achieved very acceptable suspending capacity in the absence of materials (such as water, polar activators, emulsifiers, and lime) used in the prior art to enhance the efficacy of previously used viscosifying agents. In addition, the lack of a substantial difference between the 10 second gel and 10 minute gel data indicates that these simplified drilling fluids did not significantly gel over time. As noted above, should a drilling operation have to be temporarily halted, the drilling operation can be readily restarted because these drilling fluids would not form an unacceptably stiff gel during the lull in operations.

COMPARATIVE EXAMPLES A–B

Rheology of Fluids Outside Scope of Invention

The two formulations set forth below in Table D were prepared and their properties analyzed using the techniques noted in the footnotes to the following Table E. The results of the analysis are set forth in Table E.

TABLE D

| Comparative Example | Non-aqueous Fluid, weight percent | Viscosifying Agent, weight percent |
|---|---|---|
| A | 96 wt % Saraline paraffinic fluid | 4 wt % VG69 brand bentonite organophilic clay |
| B | 96 wt % Saraline paraffinic fluid | 4 wt % Tekmud 1949 brand sulfonated ethylene - propylene-diene monomer (EPDM)-containing terpolymer |

TABLE E

| | Measurement/Result | |
|---|---|---|
| Parameter | A[c] | B[d] |
| 600 rpm dial reading[a] | 5 | 7.5 |
| 300 rpm dial reading[a] | 3 | 4.5 |
| 200 rpm dial reading[a] | 2 | 3.5 |
| 100 rpm dial reading[a] | 1 | 2 |
| 6 rpm dial reading[a] | 0 | 1 |
| 3 rpm dial reading[a] | 0 | 0.5 |
| Plastic Viscosity[b], | | |
| cp | 2 | 3 |
| Pa.s | 0.002 | 0.003 |
| Yield Point[b], | | |
| lb/100 ft$^2$ | 1 | 1.5 |
| Pa | 0.5 | 0.7 |
| 10 Second Gel[b], | | |
| lb/100 ft$^2$ | 0 | 0.5 |
| Pa | 0 | 0.2 |
| 10 Minute Gel[b], | | |
| lb/100 ft$^2$ | 0 | 0.5 |
| Pa | 0 | 0.2 |
| Apparent Viscosity[b], | | |
| cp | 2.5 | 3.8 |
| Pa.s | 0.0025 | 0.0038 |

[a]Measured using a Fann 35A brand 6 speed, viscometer while holding the sample at a temperature of 48.9° C.
[b]Determined by analyzing drilling fluid held at a temperature of 48.9° C. in accordance with the method described in API RP 13B, Section 2, Viscosity and Gel Strength, pages 6–8.
[c]Within one hour, exhibited substantial top oil separation and substantially all organophilic clay settled to bottom.
[d]Within one hour, exhibited substantial top oil separation and most sulfonated EPDM terpolymer did not dissolve and fell to bottom.

The dial reading, plastic viscosity, and yield point data listed in above Table E indicate that the suspending capacity was unacceptable for each of the tested drilling fluids that are outside the scope of the present invention (i.e., drilling fluids (i) containing viscosifying agents other than the viscosifier/fluid loss agents employed in the present invention and (ii) devoid of materials (such as water, polar activators, emulsifiers, and lime) used in the prior art to enhance the efficacy of such viscosifying agents).

Although the present invention has been described in detail with reference to some of the preferred embodiments, other versions are possible. For example, while the efficacy of the invention has been demonstrated in Examples 1–6 using Saraline brand paraffinic fluid, Peneteck brand white mineral oil, and No. 2 diesel, other non-aqueous-base fluids (e.g., other synthetics, oils, and mineral oils) can also satisfactorily perform in the compositions and methods of the present invention. Similarly, while Kraton G1702 brand thermoplastic elastomer and Thixcin R brand vegetable oil derivative have been used to demonstrate the efficacy of the invention in Examples 1–6, other viscosifying/fluid loss agents meeting the performance criteria specified herein can also satisfactorily perform in the compositions and methods of the present invention.

In addition, while the invention has been described in detail with respect to the use of viscosifying/fluid loss agents meeting certain specified criteria, another aspect of the invention is a simplified drilling fluid that comprises (A) a synthetic base oil;(B) at least one ingredient selected from the group consisting of viscosifiers, weighting agents, fluid loss control additives, lost circulation materials, polystyrene, dimer/trimer fatty acids, and mixtures thereof; (C) less than 5 weight percent water based on the total weight of water and base oil present in the wellbore fluid; (D) 6 or less total weight percent of all surfactants (e.g., primary emulsifiers, secondary emulsifiers, wetting agents) based on the total weight of all ingredients present in the wellbore fluid; (E) 1 or less weight percent shale inhibition salts based on the total weight of all ingredients present in the wellbore fluid; (F) 0.5 or less weight percent lime based on the total weight of all ingredients present in the wellbore fluid; and (G) 3 or less weight percent thinners based on the total weight of all ingredients present in the wellbore fluid. In this embodiment of the invention, the concentration of each of ingredients (C) through (G) is preferably as low as possible. In fact, the drilling fluid preferably is devoid of one or more (and more preferably devoid of all) of ingredients (C) through (G). Many advantages are derived from the use of this latter embodiment including, but not limited to, (a) increased rate of penetration due to the lower solids content of the drilling fluid, (b) decreased lost circulation and ability to drill slimmer wellbores due to the lower equivalent circulating density of the drilling fluid, and (c) better hole cleaning due to improved 3 and 6 rpm dial readings.

Accordingly, the spirit and scope of the appended claims should not necessarily be limited to the description of the preferred versions contained herein.

APPENDIX 1
REV DUST Analysis
A. Chemical Composition

| Element | Weight Percent | Oxide Formula | Oxide Percent |
|---|---|---|---|
| Al | 9.58 | $Al_2O_3$ | 18.10 |
| Si | 34.15 | $SiO_2$ | 73.10 |
| S | 0.22 | $SO_3$ | 0.55 |
| K | 0.45 | $K_2O$ | 0.55 |
| Ca | 0.43 | CaO | 0.60 |
| Ti | 0.48 | $TiO_2$ | 0.80 |

-continued

| | | | |
|---|---|---|---|
| Fe | 1.97 | FeO | 2.53 |
| O | 48.91[a] | | |

[a]Determined by stiochiometry.

B. X-ray Diffraction Data for the Clay-Size Fraction (<4 μ)

| Smectite RPI[b] | Kaolinite (RPI) | Total Clay (counts) | Pyrite (counts) | Opal CT (counts) | Total (counts) |
|---|---|---|---|---|---|
| 35% | 65% | 2910 | 30 | 110 | 3050 |

[b]"RPI" denotes relative peak intensity.

C. Size Analysis Data

| Sand. % | Silt. % | Clay % |
|---|---|---|
| 1.6 | 60.7 | 37.7 |

What is claimed is:

1. A method for drilling a borehole in a subterranean formation, the method comprising the steps of:
   (a) rotating a drill bit in the borehole; and
   (b) introducing a drilling fluid into the borehole (i) to pick up drill cuttings and (ii) to carry at least a portion of the drill cuttings out of the borehole,
   where the drilling fluid comprises:
   (A) one or more non-aqueous fluids and
   (B) one or more viscosifying/fluid loss agents selected from the group consisting of styrene-ethylene/butylene-styrene block copolymers, styrene-ethylene/propylene block copolymers, styrene-isoprene-styrene block copolymers, glyceryl-tris-12-hydroxystearate, and mixtures thereof.

2. The method of claim 1 where, except for drill cuttings from the subterranean formation, the drilling fluid consists essentially of the one or more non-aqueous fluids and the one or more viscosifying agents.

3. A method for drilling a borehole in a subterranean formation, the method comprising the steps of:
   (a) rotating a drill bit in the borehole; and
   (b) introducing a drilling fluid into the borehole (i) to pick up drill cuttings and (ii) to carry at least a portion of the drill cuttings out of the borehole,
   where the drilling fluid comprises:
   (A) one or more non-aqueous fluids and
   (B) one or more viscosifying/fluid loss agents selected from the group consisting of styrene-ethylene/butylene-styrene block copolymers, styrene-ethylene/propylene block copolymers, styrene-isoprene-styrene block copolymers, vegetable esters, and mixtures thereof; and
   where, except for drill cuttings from the subterranean formation, the drilling fluid consists of the one or more non-aqueous fluids and the one or more viscosifying agents.

4. A drilling system comprising:
   (a) a subterranean formation;
   (b) a borehole penetrating the subterranean formation;
   (c) a drill bit suspended in the borehole; and
   (d) a drilling fluid located in the borehole and proximate the drill bit,
   where the drilling fluid comprises:
   (A) one or more non-aqueous fluids and
   (B) one or more viscosifying/fluid loss agents selected from the group consisting of styrene-ethylene/butylene-styrene block copolymers, styrene-ethylene/propylene block copolymers, styrene-isoprene-styrene block copolymers, glyceryl-tris-12-hydroxystearate, and mixtures thereof.

5. A method for completing or working over a well, the method comprising the step of injecting a wellbore fluid into a well, where the wellbore fluid comprises:
   (A) one or more non-aqueous fluids and
   (B) one or more viscosifying/fluid loss agents selected from the group consisting of styrene-ethylene/butylene-styrene block copolymers, styrene-ethylene/propylene block copolymers, styrene-isoprene-styrene block copolymers, glyceryl-tris-12-hydroxystearate, and mixtures thereof.

6. A system for producing a natural resource from a subterranean formation, the system comprising:
   (a) a borehole penetrating the surface of the ground and at least a portion of a subterranean formation, the borehole having an inner surface and an axis;
   (b) a well casing situated in at least a portion of the borehole in the direction of the axis; and
   (c) a wellbore fluid located in at least a portion of the borehole,
   where the wellbore fluid comprises:
   (A) one or more non-aqueous-fluids and
   (B) one or more viscosifying/fluid loss agents selected from the group consisting of styrene-ethylene/butylene-styrene block copolymers, styrene-ethylene/propylene block copolymers, styrene-isoprene-styrene block copolymers, glyceryl-tris-12-hydroxystearate, and mixtures thereof.

7. A wellbore fluid comprising:
   (A) one or more non-aqueous fluids;
   (B) one or more viscosifying/fluid loss agents selected from the group consisting of styrene-ethylene/butylene-styrene block copolymers, styrene-ethylene/propylene block copolymers, styrene-isoprene-styrene block copolymers, glyceryl-tris-12-hydroxystearate, and mixtures thereof; and
   (C) one or more ingredients selected from the group consisting of weighting agents, dimers of fatty acids, trimers of fatty acids, fluid loss control additives, lost circulation materials, polystyrene, organophilic clays, and drill cuttings.

8. The wellbore fluid of claim 7 consisting essentially of the one or more non-aqueous fluids, the one or more viscosifying agents, and the one or more ingredients selected from the group consisting of weighting agents, dimers of fatty acids, trimers of fatty acids, fluid loss control additives, lost circulation materials, polystyrene, organophilic clays, and drill cutting.

9. A wellbore fluid consisting essentially of:
   (A) one or more non-aqueous fluids;
   (B) one or more viscosifying/fluid loss agents selected from the group consisting of styrene-ethylene/butylene-styrene block copolymers, styrene-ethylene/propylene block copolymers, styrene-isoprene-styrene block copolymers, vegetable esters, and mixtures thereof; and
   (C) ingredients selected from seven of the following eight classes: weighting agents, dimers of fatty acids, trimers of fatty acids, fluid loss control additives, lost circulation materials, polystyrene, organophilic clays, and drill cuttings.

10. A wellbore fluid consisting essentially of:
(A) one or more non-aqueous fluids;
(B) one or more viscosifying/fluid loss agents selected from the group consisting of styrene-ethylene/butylene-styrene block copolymers, styrene-ethylene/propylene block copolymers, styrene-isoprene-styrene block copolymers, vegetable esters, and mixtures thereof; and
(C) ingredients selected from six of the following eight classes: weighting agents, dimers of fatty acids, trimers of fatty acids, fluid loss control additives, lost circulation materials, polystyrene, organophilic clays, and drill cuttings.

11. A wellbore fluid consisting essentially of:
(A) one or more non-aqueous fluids;
(B) one or more viscosifying/fluid loss agents selected from the group consisting of styrene-ethylene/butylene-styrene block copolymers, styrene-ethylene/propylene block copolymers, styrene-isoprene-styrene block copolymers, vegetable esters, and mixtures thereof; and
(C) ingredients selected from five of the following eight classes: weighting agents, dimers of fatty acids, trimers of fatty acids, fluid loss control additives, lost circulation materials, polystyrene, organophilic clays, and drill cuttings.

12. A wellbore fluid consisting essentially of:
(A) one or more non-aqueous fluids;
(B) one or more viscosifying/fluid loss agents selected from the group consisting of styrene-ethylene/butylene-styrene block copolymers, styrene-ethylene/propylene block copolymers, styrene-isoprene-styrene block copolymers, vegetable esters, and mixtures thereof; and
(C) ingredients selected from four of the following eight classes: weighting agents, dimers of fatty acids, trimers of fatty acids, fluid loss control additives, lost circulation materials, polystyrene, organophilic clays, and drill cuttings.

13. The wellbore fluid of claim 7 consisting essentially of the one or more non-aqueous fluids, the one or more viscosifying agents, and ingredients selected from three of the following eight classes: weighting agents, dimers of fatty acids, trimers of fatty acids, fluid loss control additives, lost circulation materials, polystyrene, organophilic clays, and drill cuttings.

14. The wellbore fluid of claim 7 consisting essentially of the one or more non-aqueous fluids, the one or more viscosifying agents, and ingredients selected from two of the following eight classes: weighting agents, dimers of fatty acids, trimers of fatty acids, fluid loss control additives, lost circulation materials, polystyrene, organophilic clays, and drill cuttings.

15. The wellbore fluid of claim 7 consisting essentially of the one or more non-aqueous fluids, the one or more viscosifying agents, and ingredients selected from one of the following eight classes: weighting agents, dimers of fatty acids, trimers of fatty acids, fluid loss control additives, lost circulation materials, polystyrene, organophilic clays, and drill cuttings.

16. The wellbore fluid of claim 7 consisting of the one or more non-aqueous fluids, the one or more viscosifying agents, and the one or more ingredients selected from the group consisting of weighting agents, dimers of fatty acids, trimers of fatty acids, fluid loss control additives, lost circulation materials, polystyrene, organophilic clays, and drill cuttings.

17. The wellbore fluid of claim 7 comprising a total concentration of the one or more non-aqueous fluids of at least about 50 weight percent; a total concentration of the one or more viscosifying/fluid loss agents of about 0.1 to about 10 weight percent; and a total concentration of all other ingredients, except for the one or more ingredients selected from the group consisting of weighting agents, dimers of fatty acids, trimers of fatty acids, fluid loss control additives, lost circulation materials, polystyrene, organophilic clays, and drill cuttings, of less than about 15 pounds per barrel (ppb) (42.9 kg/m$^3$).

18. The wellbore fluid of claim 7 devoid of any item selected from at least one of the following seven classes: surfactants, water, lime, shale inhibiting salt, calcium chloride, thinners, and polar activators.

19. The wellbore fluid of claim 7 devoid of any item selected from at least two of the following seven classes: surfactants, water, lime, shale inhibiting salt, calcium chloride, thinners, and polar activators.

20. The wellbore fluid of claim 7 devoid of any item selected from at least three of the following seven classes: surfactants, water, lime, shale inhibiting salt, calcium chloride, thinners, and polar activators.

21. The wellbore fluid of claim 7 devoid of any item selected from at least four of the following seven classes: surfactants, water, lime, shale inhibiting salt, calcium chloride, thinners, and polar activators.

22. The wellbore fluid of claim 7 devoid of any item selected from at least five of the following seven classes: surfactants, water, lime, shale inhibiting salt, calcium chloride, thinners, and polar activators.

23. The wellbore fluid of claim 7 devoid of any item selected from at least six of the following seven classes: surfactants, water, lime, shale inhibiting salt, calcium chloride, thinners, and polar activators.

24. The wellbore fluid of claim 7 devoid of any item selected from the group consisting of surfactants, water, lime, shale inhibiting salt, calcium chloride, thinners, and polar activators.

25. The wellbore fluid of claim 7 further comprising at least one item select from the group consisting of surfactants, lime, shale inhibiting salt, calcium chloride, thinners, and polar activators, where the total concentration of all such items in the wellbore fluid is about 5.73 kg/m$^3$ (2 ppb) or less.

26. The wellbore fluid of claim 7 comprising about 5 weight percent water or less based on the total weight of water and the one or more non-aqueous fluids in the wellbore fluid.

27. A method for drilling a borehole in a subterranean formation, the method comprising the steps of:
(a) rotating a drill bit in the borehole; and
(b) introducing a drilling fluid into the borehole (i) to pick up drill cuttings and (ii) to carry at least a portion of the drill cuttings out of the borehole, where the drilling fluid is the wellbore fluid of claim 7.

28. A method for completing or working over a well, the method comprising the step of injecting the wellbore fluid of claim 7 into the well.

* * * * *